UNITED STATES PATENT OFFICE.

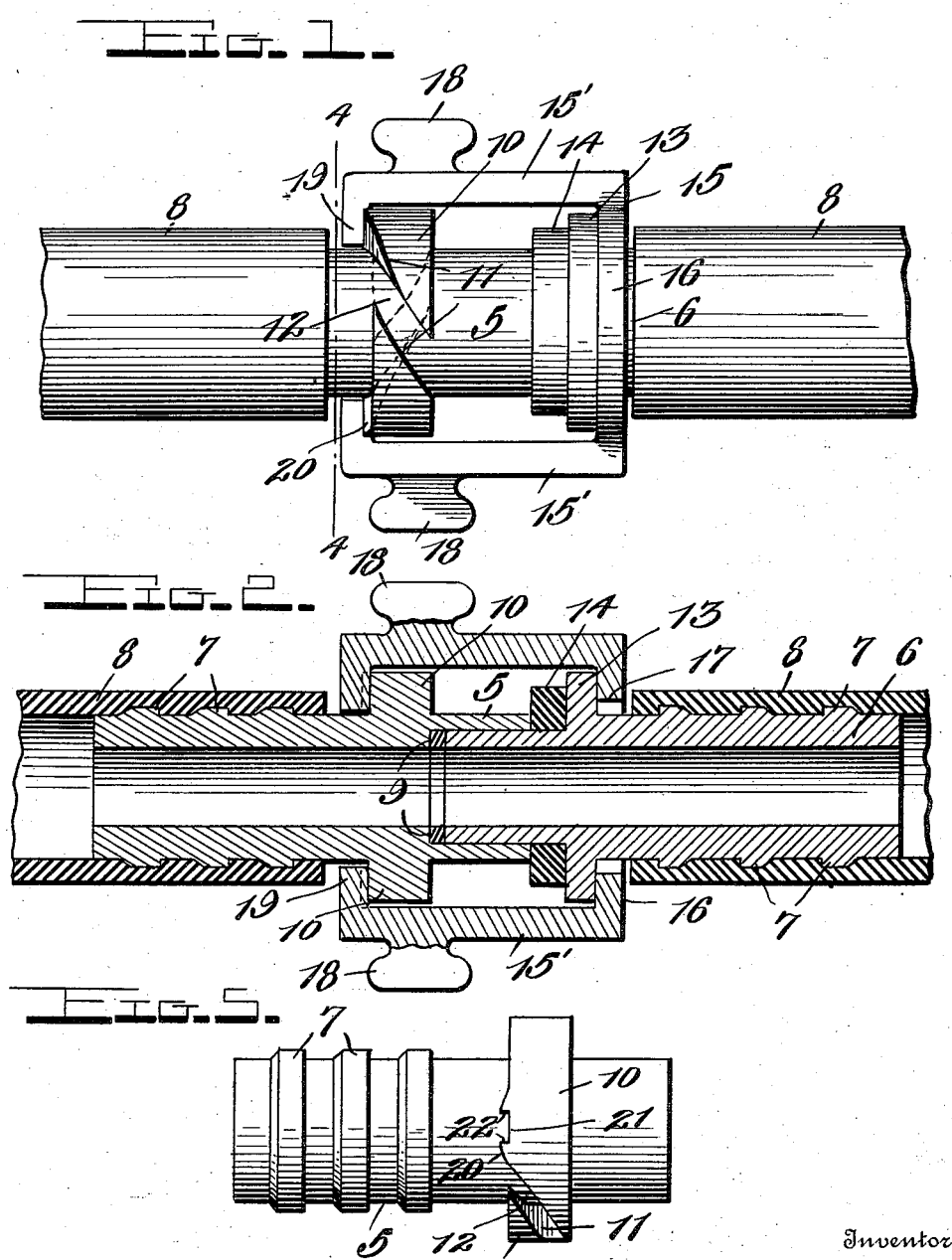

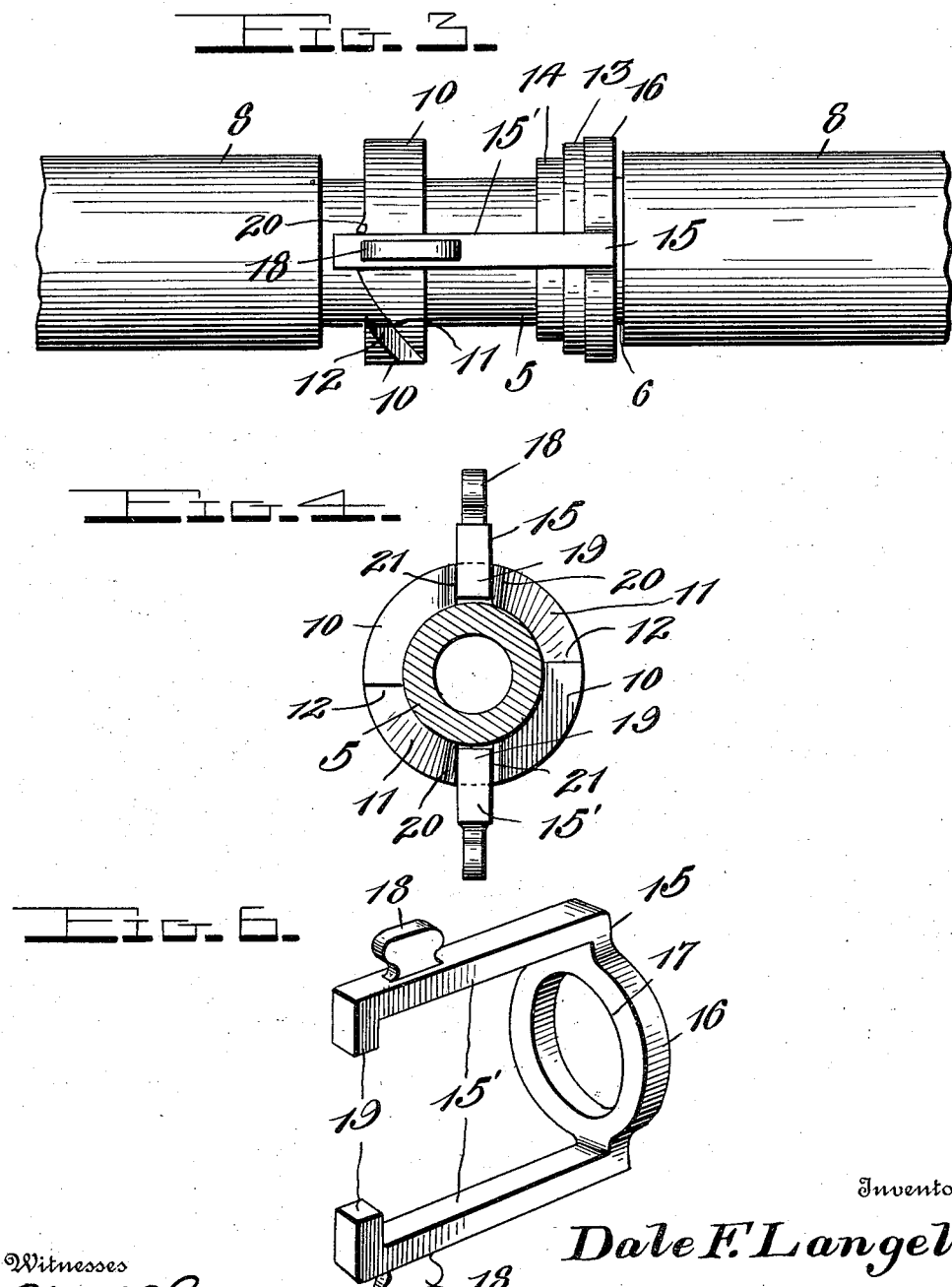

DALE F. LANGELL, OF APPLE CREEK, OHIO.

COUPLING.

1,022,485.  Specification of Letters Patent.  Patented Apr. 9, 1912.

Application filed June 7, 1911. Serial No. 631,786.

*To all whom it may concern:*

Be it known that I, DALE F. LANGELL, a citizen of the United States, residing at Apple Creek, in the county of Wayne and State of Ohio, have invented certain new and useful Improvements in Couplings, of which the following is a specification, reference being had to the accompanying drawings.

This invention relates to couplings for uniting the adjacent sections of rigid or flexible air, steam, water or other fluid conductors and has for its object to provide a simple, durable and highly efficient device of this character whereby the adjacent sections may be easily and quickly connected.

A further object of the invention is to provide a clamping yoke arranged on one of the hose or pipe sections to be connected and adapted for locking engagement with means carried by the adjacent section, suitable means being arranged between the sections at their point of union to provide a fluid tight joint.

With the above and other objects in view, the invention consists of the novel features of construction, combination and arrangement of parts hereinafter fully described and claimed, and illustrated in the accompanying drawings, in which—

Figure 1 is a side elevation of the invention employed as a hose coupling showing the ends of two hose sections coupled together; Fig. 2 is a longitudinal section; Fig. 3 is an elevation at right angles to that shown in Fig. 1; Fig. 4 is a section taken on the line 4—4 of Fig. 1; Fig. 5 is an elevation of one of the hose sections; and Fig. 6 is a detail perspective view of the clamping yoke.

Referring in detail to the drawing 5 and 6 designate the engaging ends of two coupling members or heads, the outer ends of which are ribbed or corrugated as shown at 7 to receive the hose sections 8, or said members may be otherwise constructed for connection to the hose or conductors which are to be united by my improved coupling. The end of the member 5 is enlarged and is provided with a socket 9 to receive the end of the other connecting member 6. Upon the member 5, the peripheral ribs 10 are formed. There are two such ribs which are located upon opposite sides of the member 5 and extend substantially half way therearound. Each of these ribs is provided with oppositely inclined longitudinal edge portions 11 which extend in opposite directions from the center of the rib. The adjacent ends of these ribs are spaced from each other and overlap slightly as shown in Fig. 1 to provide a spiral channel or groove 12. The opposed inclined edges of the ribs 10 on opposite sides of the member 5 form one of these grooves or channels, and said grooves extend in opposite directions with relation to each other. The other of the connecting members 6 is provided adjacent to one of its ends with an annular peripheral flange 13 and between the face of this flange and the end of the member 5, a rubber or leather gasket 14 is adapted to be arranged upon the member 6. This gasket provides a substantially fluid tight joint between the hose sections when the same are connected.

A clamping yoke 15 of substantially rectangular form is provided with a central enlarged circular portion 16 which has an opening 17 therein to loosely receive the connecting member 6. The parallel arms 15' of the clamping yoke have formed thereon suitable lugs 18 which are adapted to be grasped by the operator to turn the clamping yoke in connecting the sections. The extremities of the arms 15' are loosely disposed inwardly toward each other to form the lips 19 which are adapted to be received and moved in the grooves or channels 12 of the member 5. It will be observed from reference to Fig. 3 that the central or widest portion of the ribs 10 is provided upon its rear edge with the curved cam surfaces 20 and between these cam surfaces said rib is formed with a shallow recess 21 to provide a square shoulder 22 at each side of the recess with which the opposite edges of the lips 19 engage.

In assembling the parts to couple the adjacent hose sections together, the ribbed or corrugated end is inserted through the opening 17 in the clamping yoke 15, so that the flange 13 of said member is disposed between the arms of the yoke and abuts against the intermediate portion thereof. One of the hose sections 8 is then forced on to the ribbed or corrugated portion of the member 6. The other of the members 5 is now inserted into the end of the other of the hose sections to be connected. After first positioning the gasket 14 upon the end of the member 6, the lips 19 of the clamping yoke are disposed at the inner ends of the channels or grooves 12 formed by the ribs 10 upon opposite sides of the member 5, and said clamping yoke is turned so that the lips move in said channels and engage with the inclined edges 11 of the ribs. In this movement of the yoke, the member 5 is drawn inwardly between the arms 15 thereof and over the end of the member 6 which fits into the socket or recess 9 of the enlarged end of said member. When the end of the member 6 engages the gasket 14, the operator then grasps the lugs 18 on the clamping yoke and continues the turning movement thereof, forcing the lips 19 of the yoke against the inclined edges 11 of the ribs 10 until said lips engage the cam surfaces 20 of said inclined edges. The lips ride over these cam surfaces and into the recesses 21 of the ribs 10. These recesses, however, are not sufficiently deep to relieve the gasket 14 of all pressure by the end of the member 5, said member engaging the gasket and compressing the same until a substantially fluid tight connection is secured. When it is desired to uncouple or disconnect the hose sections, the reverse of the above described operation is performed.

From the foregoing description taken in connection with the accompanying drawing, it is thought that the construction and operation of my improved coupling will be fully understood.

The device is extremely simple, the parts therein may be readily assembled upon the hose sections to be connected, and the desired connection very quickly made. Owing to the simplicity of construction, it will also be obvious that the same can be manufactured and marketed at a comparatively small cost. It is furthermore very durable in construction and the sections cannot be accidentally disconnected or uncoupled in dragging the hose over the ground.

While I have herein described the preferred construction and arrangement of the various elements, it will be understood that the device is susceptible of considerable modification without departing from the essential feature or sacrificing any of the advantages thereof.

Having thus described the invention what is claimed is:—

The herein described coupling comprising co-acting tubular members, one of said members being enlarged to receive the end of the other member, said enlarged end of the first named member being provided with peripheral ribs extending substantially half way therearound, the ends of said ribs being inclined across their entire width and in relatively opposite directions, the ends of one rib being spaced from the ends of the other rib, the inclined ends of the ribs forming the walls of diagonal grooves which extend in opposite angular directions with relation to the longitudinal axis of said member, and a clamping yoke loosely mounted upon the other of said members and having parallel arms with inturned ends to be received in said diagonal grooves on the first named member, said inturned ends of the yoke engaging the inclined ends of said ribs to draw the members together as the yoke is turned thereon, said ribs being also provided on their corresponding longitudinal edges with square shoulders to form recesses therein to receive the ends of the yoke arms and positively prevent further turning movement of the yoke.

In testimony whereof I hereunto affix my signature in the presence of two witnesses.

DALE F. LANGELL.

Witnesses:
J. N. PALMER,
I. W. HALEY.

---

Copies of this patent may be obtained for five cents each, by addressing the "Commissioner of Patents. Washington, D. C."